(12) United States Patent
Pixley et al.

(10) Patent No.: US 9,400,598 B2
(45) Date of Patent: *Jul. 26, 2016

(54) FAST AND SMOOTH SCROLLING OF USER INTERFACES OPERATING ON THIN CLIENTS

(71) Applicant: Hillcrest Laboratories, Inc., Rockville, MD (US)

(72) Inventors: Tom Pixley, Springfield, VA (US); Dave Aufderheide, Germantown, MD (US); Frank Hunleth, Rockville, MD (US)

(73) Assignee: HILLCREST LABORATORIES, INC., Rockville, MD (US)

( * ) Notice: Subject to any disclaimer, the term of this patent is extended or adjusted under 35 U.S.C. 154(b) by 534 days.

This patent is subject to a terminal disclaimer.

(21) Appl. No.: 13/742,445

(22) Filed: Jan. 16, 2013

(65) Prior Publication Data

US 2013/0132894 A1  May 23, 2013

Related U.S. Application Data

(63) Continuation of application No. 12/287,601, filed on Oct. 10, 2008, now Pat. No. 8,359,545.

(60) Provisional application No. 60/999,130, filed on Oct. 16, 2007.

(51) Int. Cl.
  G06F 3/0488 (2013.01)
  G06F 3/0485 (2013.01)
  G06F 3/0354 (2013.01)
  G06F 3/0362 (2013.01)

(52) U.S. Cl.
  CPC .......... *G06F 3/04855* (2013.01); *G06F 3/0362* (2013.01); *G06F 3/03543* (2013.01); *G06F 3/0485* (2013.01); *G06F 2203/0335* (2013.01)

(58) Field of Classification Search
  CPC ...................................... G06F 3/0485
  USPC ......................................... 715/786
  See application file for complete search history.

(56) References Cited

U.S. PATENT DOCUMENTS

| | | |
|---|---|---|
| 4,787,051 A | 11/1988 | Olson |
| 4,839,838 A | 6/1989 | LaBiche et al. |
| 5,045,843 A | 9/1991 | Hansen |
| 5,128,671 A | 7/1992 | Thomas, Jr. |
| 5,138,154 A | 8/1992 | Hotelling |
| 5,181,181 A | 1/1993 | Glynn |

(Continued)

FOREIGN PATENT DOCUMENTS

| | | |
|---|---|---|
| EP | 0919906 A2 | 6/1999 |
| JP | 2000-148126 A | 5/2000 |

(Continued)

OTHER PUBLICATIONS

KR Office Action mailed Jan. 29, 2015 in related Application No. KR 10-2010-7010689.

(Continued)

*Primary Examiner* — Reza Nabi
(74) *Attorney, Agent, or Firm* — Patent Portfolio Builders PLLC

(57) ABSTRACT

Systems and methods according to the present invention provide a user interface for scrolling through lists of information on user interfaces.

18 Claims, 11 Drawing Sheets

(56) References Cited

U.S. PATENT DOCUMENTS

| | | | |
|---|---|---|---|
| 5,359,348 A | 10/1994 | Pilcher et al. | |
| 5,396,265 A | 3/1995 | Ulrich et al. | |
| 5,440,326 A | 8/1995 | Quinn | |
| 5,453,758 A | 9/1995 | Sato | |
| 5,484,355 A | 1/1996 | King, II et al. | |
| 5,506,605 A | 4/1996 | Paley | |
| 5,554,980 A | 9/1996 | Hashimoto et al. | |
| 5,698,784 A | 12/1997 | Hotelling et al. | |
| 5,703,623 A | 12/1997 | Hall et al. | |
| 5,757,360 A | 5/1998 | Nitta et al. | |
| 5,757,381 A * | 5/1998 | Shoji | G06F 3/0613 345/684 |
| 5,796,354 A | 8/1998 | Cartabiano et al. | |
| 5,819,206 A | 10/1998 | Horton et al. | |
| 5,825,350 A | 10/1998 | Case, Jr. et al. | |
| 5,835,156 A | 11/1998 | Blonstein et al. | |
| 5,898,421 A | 4/1999 | Quinn | |
| 5,912,612 A | 6/1999 | DeVolpi | |
| 5,955,988 A | 9/1999 | Blonstein et al. | |
| 5,959,626 A * | 9/1999 | Garrison | G06F 3/0482 715/784 |
| 5,973,757 A * | 10/1999 | Aubuchon | H03J 1/0025 340/12.55 |
| 6,002,394 A | 12/1999 | Schein et al. | |
| 6,016,144 A | 1/2000 | Blonstein et al. | |
| 6,049,823 A | 4/2000 | Hwang | |
| 6,069,594 A | 5/2000 | Barnes et al. | |
| 6,115,028 A | 9/2000 | Balakrishnan et al. | |
| 6,128,032 A * | 10/2000 | Oh | G09G 5/395 348/E5.099 |
| 6,164,808 A | 12/2000 | Shibata et al. | |
| 6,191,774 B1 | 2/2001 | Schena et al. | |
| 6,239,797 B1 * | 5/2001 | Hills | G06F 17/3089 345/684 |
| 6,369,794 B1 | 4/2002 | Sakurai et al. | |
| 6,400,996 B1 | 6/2002 | Hoffberg et al. | |
| 6,466,198 B1 | 10/2002 | Feinstein | |
| 6,466,831 B1 | 10/2002 | Shibata et al. | |
| 6,473,713 B1 | 10/2002 | McCall et al. | |
| 6,492,981 B1 | 12/2002 | Stork et al. | |
| 6,544,126 B2 | 4/2003 | Sawano et al. | |
| 6,650,313 B2 | 11/2003 | Levine et al. | |
| 6,672,962 B1 | 1/2004 | Ozaki et al. | |
| 6,690,391 B1 * | 2/2004 | Proehl | G06F 3/0362 715/720 |
| 6,753,849 B1 | 6/2004 | Curran et al. | |
| 6,757,446 B1 | 6/2004 | Li et al. | |
| 6,856,326 B1 * | 2/2005 | Zhai | G06F 9/4443 345/684 |
| 6,929,548 B2 | 8/2005 | Wang | |
| 6,933,923 B2 | 8/2005 | Feinstein | |
| 6,973,457 B1 * | 12/2005 | Bastawala | G06F 17/3041 707/770 |
| 6,973,625 B1 * | 12/2005 | Lupo | G06F 8/38 715/744 |
| 6,984,208 B2 | 1/2006 | Zheng | |
| 6,990,639 B2 | 1/2006 | Wilson | |
| 6,998,966 B2 | 2/2006 | Pedersen et al. | |
| 7,098,891 B1 | 8/2006 | Pryor | |
| 7,139,983 B2 * | 11/2006 | Kelts | G06F 3/0481 707/E17.009 |
| 7,158,118 B2 | 1/2007 | Liberty | |
| 7,173,604 B2 | 2/2007 | Marvit et al. | |
| 7,188,045 B1 | 3/2007 | Cirielli | |
| 7,231,385 B2 * | 6/2007 | Bernal | G06F 17/245 |
| 7,236,156 B2 | 6/2007 | Liberty et al. | |
| 7,239,301 B2 | 7/2007 | Liberty et al. | |
| 7,262,760 B2 | 8/2007 | Liberty | |
| 7,353,134 B2 | 4/2008 | Cirielli | |
| 7,379,050 B2 * | 5/2008 | Chou | G06F 3/0213 345/156 |
| 7,414,611 B2 | 8/2008 | Liberty | |
| 7,489,297 B2 * | 2/2009 | Hohmann | G06F 3/043 345/156 |
| 7,681,141 B2 * | 3/2010 | Tu | G06F 3/0485 715/763 |
| 7,877,702 B2 * | 1/2011 | Mahasintunan | G06F 3/0485 707/797 |
| 7,930,646 B2 * | 4/2011 | De Souza Sana | G06F 3/0481 715/784 |
| 8,359,545 B2 * | 1/2013 | Pixley | G06F 3/03543 345/157 |
| 2002/0158843 A1 | 10/2002 | Levine et al. | |
| 2003/0107551 A1 | 6/2003 | Dunker | |
| 2003/0146938 A1 * | 8/2003 | Geiger | G06F 3/0483 715/784 |
| 2003/0159051 A1 | 8/2003 | Hollnagel | |
| 2003/0193572 A1 | 10/2003 | Wilson et al. | |
| 2004/0031058 A1 | 2/2004 | Reisman | |
| 2004/0095317 A1 | 5/2004 | Zhang et al. | |
| 2004/0104891 A1 * | 6/2004 | Sacca | G06F 3/03545 345/156 |
| 2004/0193413 A1 | 9/2004 | Wilson et al. | |
| 2004/0204240 A1 | 10/2004 | Barney | |
| 2004/0229693 A1 | 11/2004 | Lind et al. | |
| 2004/0239626 A1 | 12/2004 | Noguera | |
| 2004/0268393 A1 * | 12/2004 | Hunleth | G06F 3/0482 725/44 |
| 2005/0008148 A1 | 1/2005 | Jacobson | |
| 2005/0097601 A1 * | 5/2005 | Danker | H04N 5/44543 725/39 |
| 2005/0117130 A1 * | 6/2005 | Bohn | G06F 3/033 353/119 |
| 2005/0125826 A1 * | 6/2005 | Hunleth | G06F 3/0482 725/45 |
| 2005/0128316 A1 * | 6/2005 | Sugimori | H04N 1/6011 348/223.1 |
| 2005/0154988 A1 * | 7/2005 | Proehl | G06F 3/0362 715/720 |
| 2005/0174324 A1 | 8/2005 | Liberty et al. | |
| 2005/0210391 A1 * | 9/2005 | Othmer | G06F 3/0481 715/738 |
| 2005/0212767 A1 | 9/2005 | Marvit et al. | |
| 2005/0243062 A1 | 11/2005 | Liberty | |
| 2005/0246738 A1 * | 11/2005 | Lockett | H04N 5/4403 725/43 |
| 2005/0253806 A1 | 11/2005 | Liberty et al. | |
| 2005/0257166 A1 * | 11/2005 | Tu | G06F 3/0485 715/787 |
| 2005/0289524 A1 * | 12/2005 | McGinnes | G06F 8/10 717/140 |
| 2006/0028446 A1 | 2/2006 | Liberty et al. | |
| 2006/0092133 A1 | 5/2006 | Touma et al. | |
| 2006/0143655 A1 * | 6/2006 | Ellis | H04N 5/44543 725/47 |
| 2006/0182362 A1 | 8/2006 | McLain et al. | |
| 2006/0184966 A1 * | 8/2006 | Hunleth | G06F 3/017 725/39 |
| 2006/0236263 A1 * | 10/2006 | Bathiche | G06F 3/016 715/786 |
| 2006/0250358 A1 * | 11/2006 | Wroblewski | G06F 3/0346 345/157 |
| 2006/0262116 A1 * | 11/2006 | Moshiri | G06F 3/0346 345/419 |
| 2007/0035518 A1 * | 2/2007 | Francz | G06F 3/0346 345/163 |
| 2007/0052689 A1 * | 3/2007 | Tak | G06F 3/0485 345/173 |
| 2007/0100915 A1 * | 5/2007 | Rose | G06F 17/30873 |
| 2007/0136268 A1 * | 6/2007 | Qureshi | G06F 17/3089 |
| 2007/0159642 A1 * | 7/2007 | Choi | G06T 3/40 358/1.2 |
| 2007/0206022 A1 | 9/2007 | Skaggs | |
| 2007/0206831 A1 * | 9/2007 | Matsuno | H04N 1/32101 382/100 |
| 2007/0288958 A1 * | 12/2007 | Knudson | G06F 3/0482 725/39 |
| 2008/0079972 A1 * | 4/2008 | Goodwin | G06F 3/0485 358/1.12 |
| 2009/0094548 A1 * | 4/2009 | Nobori | G06F 3/0485 715/786 |
| 2009/0128489 A1 * | 5/2009 | Liberty | G06F 3/017 345/158 |

(56) References Cited

U.S. PATENT DOCUMENTS

| | | | |
|---|---|---|---|
| 2009/0202001 A1* | 8/2009 | Mitasaki | H04N 19/172 375/240.29 |
| 2009/0214183 A1* | 8/2009 | Sugahara | G11B 20/00007 386/356 |
| 2009/0259939 A1* | 10/2009 | Lockett | H04N 5/4403 715/716 |
| 2010/0067583 A1* | 3/2010 | Suh | H04H 20/28 375/240.26 |
| 2010/0319014 A1* | 12/2010 | Lockett | H04N 5/4403 725/14 |
| 2011/0058103 A1* | 3/2011 | Lin | H04N 5/44591 348/569 |
| 2011/0067068 A1* | 3/2011 | Hunleth | G06F 3/017 725/52 |
| 2011/0225196 A1* | 9/2011 | Haseyama | G06F 17/30781 707/780 |
| 2014/0245213 A1* | 8/2014 | Gardenfors | H04L 51/066 715/778 |

FOREIGN PATENT DOCUMENTS

| | | | |
|---|---|---|---|
| KR | 10-2002-0093898 A | | 12/2002 |
| KR | 10-2006-0135695 A | | 12/2006 |
| WO | 96 11435 A1 | | 4/1996 |
| WO | 01 78055 | | 10/2001 |
| WO | 02/063453 A2 | | 8/2002 |
| WO | 03 048909 A2 | | 6/2003 |
| WO | 2005/069201 A2 | | 7/2005 |
| WO | 2005 099166 A2 | | 10/2005 |

OTHER PUBLICATIONS

IEEE Standards, "802.16 IEEE Standard for Local and Metropolitan Area Networks, Part 16: Air Interface for Fixed Broadband Wireless Access Systems," IEEE Std 802.16-2004, Oct. 1, 2004, pp. 1-857.

Ang, W. T., et al., "Physical Model of a MEMS Accelerometer for Low-g Motion Tracking Applications," Proceedings of the 2004 IEEE International Conference on Robotics & Automation, Apr. 2004, pp. 1345-1351.

Bachmann, E. R., "Inertial and Magnetic Tracking of Limb Segment Orientation for Inserting Humans into Synthetic Environments," Dissertation, Naval Postgraduate School, Monterey, California, Dec. 2000, pp. 1-178.

Bachmann, E. R., et al., "Orientation Tracking for Humans and Robots Using Inertial Sensors," IEEE International Symposium on Computational Intelligence in Robotics and Automation, CIRA '99 Proceedings, 1999, pp. 187-194.

Bachmann, E. R., et al., "Design and Implementation of MARG Sensors for 3-DOF Orientation Measurement of Rigid Bodies," IEEE International Conference on Robotics and Automation, ICRA '03, Sep. 2003, vol. 1, pp. 1171-1178.

Baerveldt, A-J., et al., "A Low-Cost and Low-Weight Attitude Estimation System for an Autonomous Helicopter," 1997 IEEE International Conference on Intelligent Engineering Systems, INES '97 Proceedings, Sep. 1997, pp. 391-395.

Barshan, B., et al., "Inertial Navigation Systems for Mobile Robots," IEEE Transactions on Robotics and Automation, vol. 11, No. 3, Jun. 1995, pp. 328-342.

Bibi, F., et al., "Modeling and Simulation of Bias Uncertainty of Gyroscope for Improved Navigation," 2nd International Bhurban Conference on Applied Sciences and Technology, Bhurban, Pakistan, Jun. 16-21, 2003, pp. 1-9.

Blomster, J., "Orientation Estimation Combining Vision and Gyro Measurements," KTH Electrical Engineering, Master's Degree Project, Stockholm, Sweden, Apr. 6, 2006, pp. 1-44.

Choukroun, D., "Novel Methods for Attitude Determination Using Vector Observations," Research Thesis, Senate of the Technion—Israel Institute of Technology, May 2003, pp. 1-290.

Choukroun, D., et al., "A Novel Quaternion Kalman Filter," TAE No. 930, Faculty of Aerospace Engineering, Technion—Israel Institute of Technology, Jan. 2004, pp. 1-53.

Dogancay, K., "Bias Compensation for the Bearings-Only Pseudolinear Target Track Estimator," IEEE Transactions on Signal Processing, vol. 54, No. 1, Jan. 2006, pp. 59-68.

Foxlin, E., "Inertial Head-Tracker Sensor Fusion by a Complementary Separate-Bias Kalman Filter," Proceedings of the IEEE 1996 Virtual Reality Annual International Symposium, 1996, pp. 185-194, 267.

Foxlin, E., "Pedestrian Tracking with Shoe-Mounted Inertial Sensors," Computer Graphics and Applications, IEEE, vol. 25, No. 6, 2005, pp. 38-46.

Gebre-Egziabher, D., et al., "A Gryo-Free Quaternion-Based Attitude Determination System Suitable for Implementation Using Low Cost Sensors," Position Location and Navigation Symposium, IEEE, 2000, pp. 185-192.

Gripton, A., "The Application and Future Development of a MEMS SiVS® for Commercial and Military Inertial Products," Position Location and Navigation Symposium, IEEE, 2002, pp. 28-35.

Hide, C., et al., "Multiple Model Kalman Filtering for GPS and Low-Cost INS Integration," Institute of Engineering, Surveying and Space Geodesy (IESSG), University of Nottingham, Sep. 21-24, 2004; pp. 1-8.

Hong, S., et al., "Observability of Error States in GPS/INS Integration," IEEE Transactions on Vehicular Technology, vol. 54, No. 2, Mar. 2005, pp. 731-743.

Mahony, R., et al., "Complementary Filter Design on the Special Orthogonal Group SO(3)," 44th IEEE Conference on Decision and Control, and 2005 European Control Conference, CDC-ECC '05, Dec. 2005, pp. 1477-1484.

Kraft, E., "A Quaternion-based Unscented Kalman Filter for Orientation Tracking," Proceedings of the Sixth International Conference of Information Fusion, vol. 1, 2003, pp. 47-54.

Leavitt, J., et al., "High Bandwidth Tilt Measurement Using Low-Cost Sensors," IEEE/ASME Transactions on Mechatronics, vol. 11, No. 3, Jun. 2006, pp. 320-327.

Park, S., et al., "Examples of Estimation Filters from Recent Aircraft Projects at MIT," Nov. 2004, pp. 1-15.

Park, H. W., et al., "Covariance Analysis of Strapdown INS Considering Gyrocompass Characteristics," IEEE Transactions on Aerospace and Electronic Systems, vol. 31, No. 1, Jan. 1995, pp. 320-328.

Rios, J. A., et al., "Fusion Filter Algorithm Enhancements for a MEMS GPS/IMU," Crossbow Technology, Inc., 2002; pp. 1-12.

Roumeliotis, S. I., et al., "Circumventing Dynamic Modeling: Evaluation of the Error-State Kalman Filter Applied to Mobile Robot Localization," 1999 IEEE International Conference Proceedings on Robotics and Automation, vol. 2, 1999, pp. 1656-1663.

Welch, G. F., "SCAAT: Incremental Tracking with Incomplete Information," Department of Computer Science, UNC—Chapel Hill, TR96-051, Oct. 1996, pp. 1-207.

International Search Report for PCT/US 08/11654 mailed Dec. 22, 2008.

Written Opinion for PCT/US 08/11654 mailed Dec. 22, 2008.

Discussion Thread at Sitepoint <http://www.sitepoint.com>, "Display please wait message while querying", published on Jan. 2001; 2 pages.

Appendices A, B and C, from U.S. Pat. No. 6,069,594 to Barnes et al., pp. 1-104, May 30, 2000.

Supplemental European Search Report for Application No. EP 05 74 4089 mailed Mar. 6, 2008.

Supplemental European Search Report for Application No. EP 05 76 1047 mailed Apr. 2, 2008.

European Search Report for Application No. EP 05757855 mailed Apr. 10, 2008.

S. Strachan, et al., "Muscle Tremor as an Input Mechanism," UIST '04, XP002473042, Oct. 24-27, 2004, pp. 1-2.

International Search Report for PCT/US05/15051 mailed Feb. 19, 2008.

Written Opinion for PCT/US05/15051 mailed Feb. 19, 2008.

Office Action for Chinese Application No. 200580021163.7 mailed Jan. 25, 2008.

International Search Report for PCT/US05/42558 mailed Nov. 30, 2006.

Written Opinion for PCT/US05/42558 mailed Nov. 30, 2006.

(56) References Cited

OTHER PUBLICATIONS

W. T. Ang, et al., "Design and Implementation of Active Error Canceling in Hand-held Microsurgical Instrument," Proceedings of the 2001 IEEE/RSJ International Conference on Intelligent Robots and Systems, vol. 2, Oct. 2001, pp. 1106-1111.

W. T. Ang, et al., "Design of All-Accelerometer Inertial Measurement Unit for Tremor Sensing in Hand-held Microsurgical Instrument," Proceedings of the 2003 IEEE International Conference on Robotics & Automation, Sep. 2003, pp. 1781-1786.

J. Jakubowski, et al., "Increasing Effectiveness of Human Hand Tremor Separation Process by Using Higher-Order Statistics," Measurement Science Review, vol. 1, No. 1, 2001, pp. 43-46.

J. Jakubowski, et al., "Higher Order Statistics and Neural Network for Tremor Recognition," IEEE Transactions on Biomedical Engineering, vol. 49, No. 2, Feb. 2002, pp. 152-159.

J. Raethjen, et al., "Tremor Analysis in Two Normal Cohorts," Clinical Neurophysiology 115, 2004, pp. 2151-2156.

C. N. Riviere, et al., "Adaptive Canceling of Physiological Tremor for Improved Precision in Microsurgery," IEEE Transactions on Biomedical Engineering, vol. 45, No. 7, Jul. 1998, pp. 839-846.

J. Timmer, et al., "Characteristics of Hand Tremor Time Series," Biological Cybernetics, vol. 70, 1993, pp. 75-80.

J. Timmer, et al., "Cross-Spectral Analysis of Physiological Tremor and Muscle Activity: I Theory and application to Unsynchronized Electromyogram," Biological Cybernetics, vol. 78, 1998, pp. 349-357.

J. Timmer, et al., "Cross-Spectral Analysis of Physiological Tremor and Muscle Activity: II Application to Synchronized Electromyogram," Biological Cybernetics, vol. 78, 1998, pp. 359-368.

J. Timmer, "Modeling Noisy Time Series: Physiological Tremor," International Journal of Bifurcation and Chaos, vol. 8, No. 7, 1998, pp. 1505-1516.

J. Timmer, et al., "Cross-Spectral Analysis of Tremor Time Series," International Journal of Bifurcation and Chaos, vol. 10, No. 11, 2000, pp. 2595-2610.

J. Timmer, et al., "Pathological Tremors: Deterministic Chaos or Nonlinear Stochastic Oscillators?" Chaos, vol. 10, No. 1, Mar. 2000, pp. 278-288.

V. Digalakis, et al., "ML Estimation of a Stochastic Linear System with the EM Algorithm and Its Application to Speech Recognition," IEEE Transactions on Speech and Audio Processing, vol. 1, No. 4, Oct. 1993, pp. 431-442.

S. Haykin, et al., "Adaptive Tracking of Linear Time-Variant Systems by Extended RLS Algorithms," IEEE Transactions on Signal Processing, vol. 45, No. 5, May 1997, pp. 1118-1128.

B. F. La Scala, et al., "Design of an Extended Kalman Filter Frequency Tracker," IEEE Transactions on Signal Processing, vol. 44, No. 3, Mar. 1996, pp. 739-742.

K. Nishiyama, "Robust Estimation of a Single Complex Sinusoid in White Noise—H∞ Filtering Approach," IEEE Transactions on Signal Processing, vol. 47, No. 10, Oct. 1999, pp. 2853-2856.

K. Nishiyama, "A Nonlinear Filter for Estimating a Sinusoidal Signal and its Parameters in White Noise: On the Case of a Single Sinusoid," IEEE Transactions on Signal Processing, vol. 45, No. 4, Apr. 1997, pp. 970-981.

B. Widrow, et al., "Fundamental Relations Between the LMS Algorithm and the DFT," IEEE Transactions on Circuits and Systems, vol. 34, No. CAS-7, Jul. 1987, pp. 814-820.

A. H. Sayed, "A Framework for State-Space Estimation with Uncertain Models," IEEE Transactions on Automatic Control, vol. 46, No. 7, Jul. 2001, pp. 998-1013.

Website: J. Timmer, "Data Analysis and Modeling of Dynamic Processes in the Life Sciences," Freiburg Center for Data Analysis and Modeling, http://webber.physik.uni-freiburg.de/~jeti/, retrieved Aug. 17, 2007, pp. 1-2.

Website: "Freiburg Center for Data Analysis and Modeling—Publications," http://www.fdm.uni-freiburg.de/cms/puplications/publications/, retrieved Aug. 17, 2007, pp. 1-11.

Website: C. Riviere, Robotics Institute, http://www.ri.cmu.edu/people/riviere_cameron.html, retrieved Aug. 17, 2007, pp. 1-4.

Website: A. Beuter, Publications, University of Quebec at Montreal, http://www.er.uqam.ca/nobel/r11040/publicat.htm, retrieved Aug. 17, 2007, pp. 1-7.

Website: R. Murray-Smith, Hamilton Institute, http://www.dcs.gla.ac.uk/~rod/, retrieved Aug. 17, 2007, pp. 1-5.

Website: Z. Jian, et al., "Adaptive Noise Cancellation," Rice University, http://www.ece.rice.edu/~klwang/elec434/elec434.htm, retrieved Aug. 17, 2007, pp. 1-6.

P. Navarrete, et al., "Eigenspace-based Recognition of Faces: Comparisons and a new Approach," Image Analysis and Processing, 2001, pp. 1-6.

C. Liu, et al., "Enhanced Fisher Linear Discriminant Models for Face Recognition," Proc. 14th International Conference on Pattern Recognition, Queensland, Australia, Aug. 17-20, 1998, pp. 1-5.

International Search Report for PCT/US05/15096, mailed May 15, 2006.

Written Opinion for PCT/US05/15096, mailed May 15, 2006.

International Search Report for PCT/US04/35369, mailed May 11, 2006.

Written Opinion for PCT/US04/35369, mailed May 11, 2006.

J. Geen, et al., "New iMEMS Angular-Rate-Sensing Gyroscope," Analog Dialogue, 37-03 (2003), pp. 1-4.

C. N. Riviere, et al., "Toward Active Tremor Canceling in Handheld Microsurgical Instruments," IEEE Transactions on Robotics and Automation, vol. 19, No. 5, Oct. 2003, pp. 793-800.

Website: A. H. Sayed, "UCLA Adaptive Systems Laboratory—Home Page," UCLA, http://asl.ee.ucla.edu/index.php?option=com_frontpage<emid=1, retrieved Aug. 17, 2007, p. 1.

Supplemental European Search Report for Application No. EP 04 79 6360 mailed Apr. 2, 2008.

* cited by examiner

FAST AND SMOOTH SCROLLING OF USER INTERFACES OPERATING ON THIN CLIENTS

RELATED APPLICATIONS

This application is a continuation of U.S. patent application Ser. No. 12/287,601, filed on Oct. 10, 2008, which is related to, and claims priority from, U.S. Provisional Patent Application Ser. No. 60/999,130, entitled "Fast and Smooth Scrolling of User Interfaces Operating on Thin Clients", to Tom Pixley et al., filed on Oct. 16, 2007, the disclosures of which are incorporated here by reference.

BACKGROUND

This application describes, among other things, scrolling on user interfaces in a fast and smooth manner.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

One common type of navigation functionality that is provided in many types of user interfaces is scrolling. The term "scrolling" refers to the act of sliding a horizontal or vertical presentation of content, such as text, drawings, or images, across a screen or display window. In a typical computer system when creating a scrolling content area, the graphical content to fill that area can be generated on the fly by the computer as the user provides inputs to the user interface which indicate his or her desire to scroll. However, depending on the resources of the system which is generating the user interface, the type of content being scrolled, the transition effects associated with the scrolling, the speed of scrolling and/or other processing-related considerations, it may not be possible to generate the new content which fills the areas which become visible on the user interface as fast as the user might expect given his or her scrolling inputs. For example, user interfaces running on so-called "thin" clients, e.g., set-top boxes, having relatively few processing resources as compared to high-end personal computers, may not be able to supply the resources needed to generate the scrolling content quickly enough.

Accordingly, it would be desirable to provide systems, methods, devices and software for fast and smooth scrolling of user interfaces operating on, e.g., thin clients.

SUMMARY

Systems and methods according to the present invention address this need and others by providing mechanisms to facilitate for fast and smooth scrolling of user interfaces operating on, e.g., thin clients.

According to one exemplary embodiment a method for scrolling within a graphical user interface comprising: displaying a first portion of a list having a first plurality of entries which are visible on the graphical user interface; receiving user input to scroll the list by a number of entries; displaying an animation of dummy data in portions of the graphical user interface associated with the first plurality of entries while the list is being scrolled; ceasing scrolling; and replacing the animation of dummy data with a second portion of the list including a second plurality of entries.

According to another exemplary embodiment, a computer-readable medium contains program instructions coded thereon which, when executed by a computer or processor, performs the steps of displaying a first portion of a list having a first plurality of entries which are visible on the graphical user interface, receiving user input to scroll the list by a number of entries, displaying an animation of dummy data in portions of the graphical user interface associated with the first plurality of entries while the list is being scrolled, ceasing scrolling, and replacing the animation of dummy data with a second portion of the list including a second plurality of entries.

According to yet another exemplary embodiment, a user interface includes a first portion of a list of items currently displayed on the user interface, and a mechanism for receiving a user input to scroll the list, wherein the user interface displays an animation of dummy data while the list is being scrolled and subsequently replaces the animation of dummy data with a second portion of the list.

BRIEF DESCRIPTION OF THE DRAWINGS

The accompanying drawings illustrate exemplary embodiments of the present invention, wherein.

DETAILED DESCRIPTION

Figure 1:
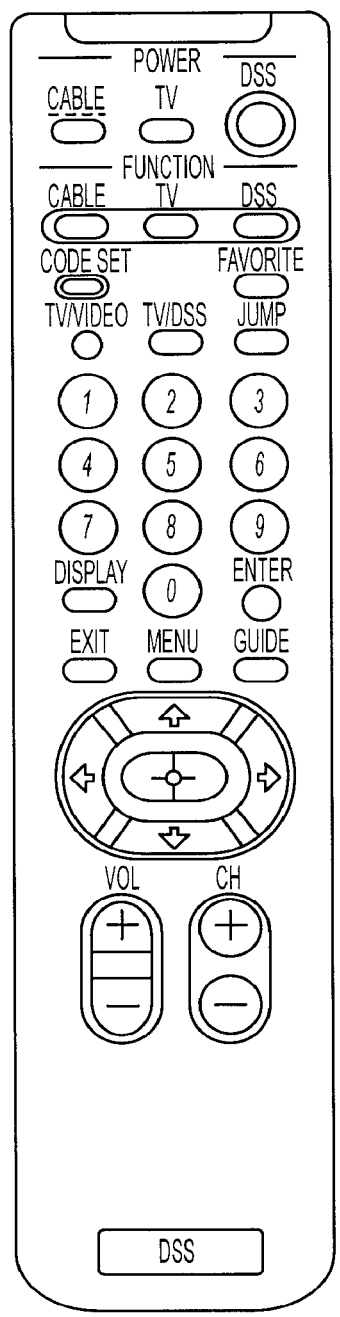
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
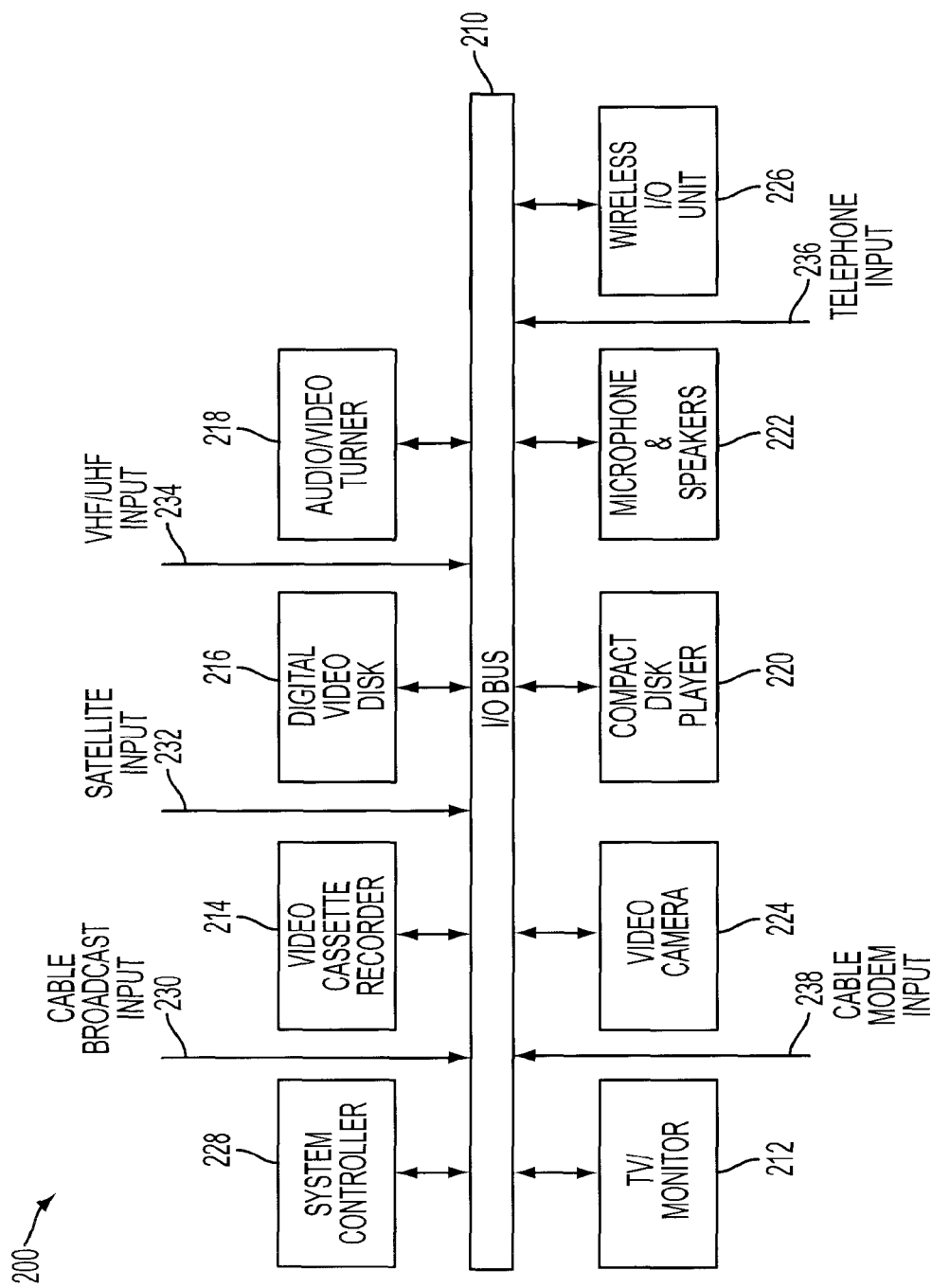
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. patent application "A Control Framework with a Zoomable Graphical User Interface for Organizing, Selecting and Launching Media Items". Alternatively, remote devices and interaction techniques between remote devices and user interfaces in accordance with the present invention can be used in conjunction with other types of systems, for example computer systems including, e.g., a display, a processor and a memory system or with various other systems and applications.

Figure 3A:
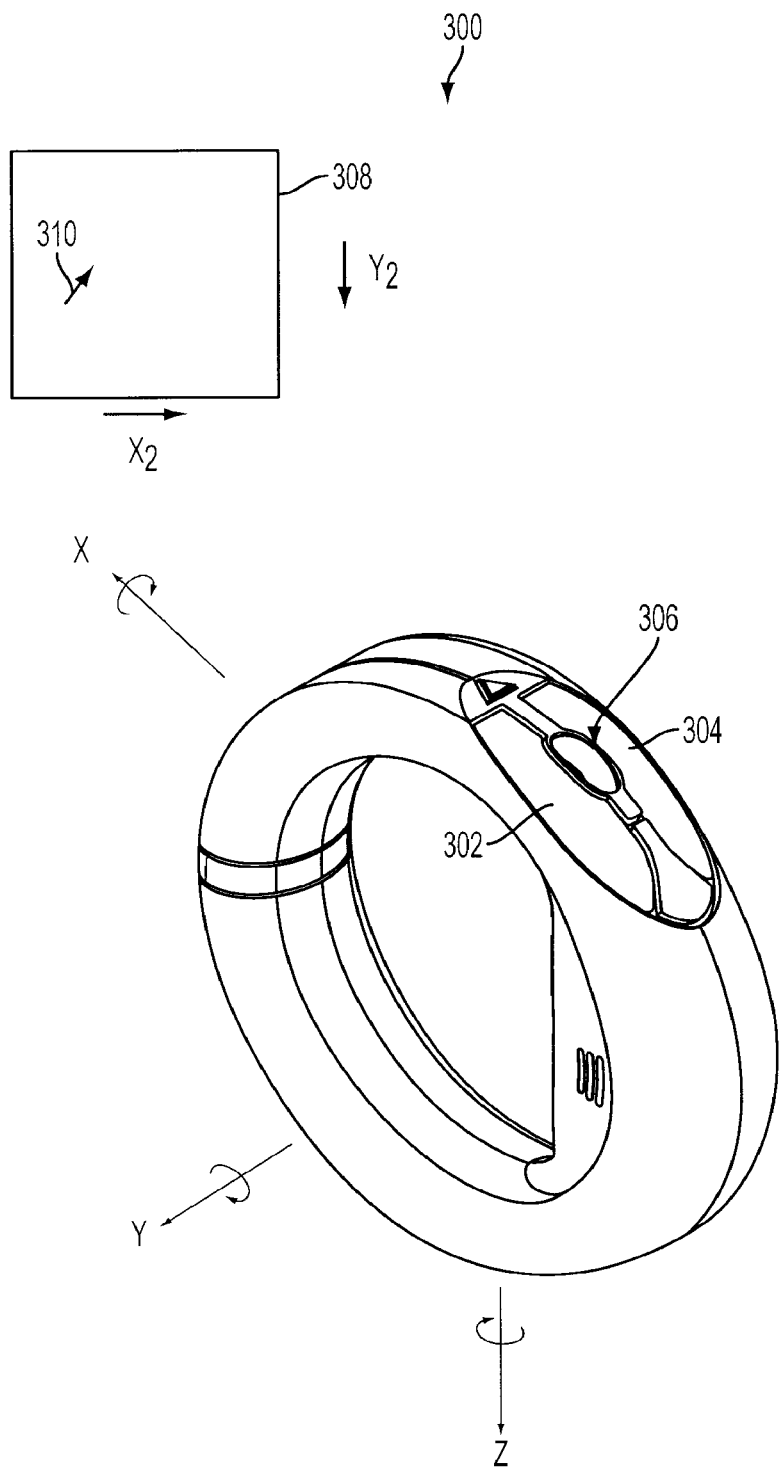
FIG. 3(a) shows a 3D pointing device according to an exemplary embodiment of the present invention.

As mentioned in the Background section, remote devices which operate as 3D pointers are of particular interest for the present specification, although the present invention is not limited to systems including 3D pointers. Such devices enable the translation of movement of the device, e.g., linear movement, rotational movement, acceleration or any combination thereof, into commands to a user interface. An exemplary loop-shaped, 3D pointing device 300 is depicted in FIG. 3(a), however the present invention is not limited to loop-shaped devices. In this exemplary embodiment, the 3D pointing device 300 includes two buttons 302 and 304 as well as a scroll wheel 306 (scroll wheel 306 can also act as a button by depressing the scroll wheel 306), although other exemplary embodiments will include other physical configurations. User movement of the 3D pointing device 300 can be defined, for example, in terms of rotation about one or more of an x-axis attitude (roll), a y-axis elevation (pitch) or a z-axis heading (yaw). In addition, some exemplary embodiments of the present invention can additionally (or alternatively) measure linear movement of the 3D pointing device 300 along the x, y, and/or z axes to generate cursor movement or other user interface commands. An example is provided below. A number of permutations and variations relating to 3D pointing devices can be implemented in systems according to exemplary embodiments of the present invention. The interested reader is referred to U.S. patent application Ser. No. 11/119,663, entitled (as amended) "3D Pointing Devices and Methods", filed on May 2, 2005, U.S. patent application Ser. No. 11/119,719, entitled (as amended) "3D Pointing Devices with Tilt Compensation and Improved Usability", also filed on May 2, 2005, U.S. patent application Ser. No. 11/119,987, entitled (as amended) "Methods and Devices for Removing Unintentional Movement in 3D Pointing Devices", also filed on May 2, 2005, and U.S. patent application Ser. No. 11/119,688, entitled "Methods and Devices for Identifying Users Based on Tremor", also filed on May 2, 2005, the disclosures of which are incorporated here by reference, for more details regarding exemplary 3D pointing devices which can be used in conjunction with exemplary embodiments of the present invention.

Figure 3B:
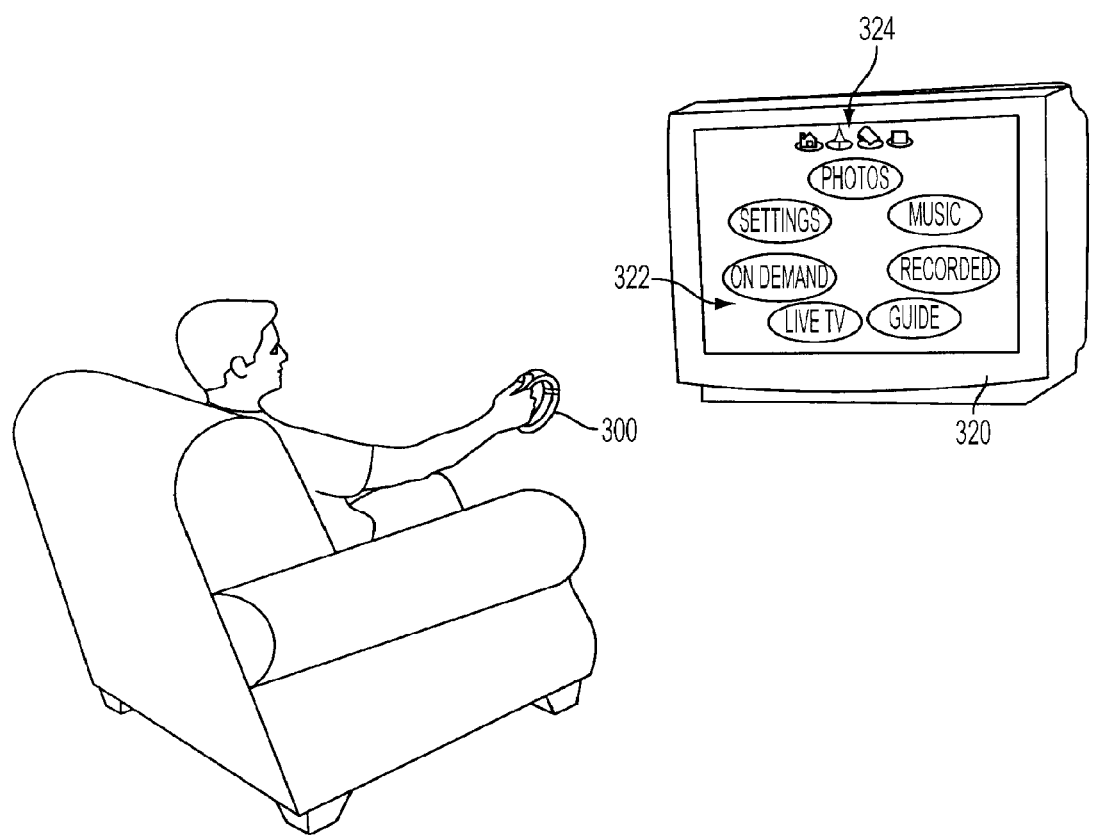
FIG. 3(b) illustrates a user employing a 3D pointing device to provide input to a user interface on a television according to an exemplary embodiment of the present invention.

According to exemplary embodiments of the present invention, it is anticipated that 3D pointing device 300 will be held by a user in front of a display 308 and that motion of the 3D pointing device 300 will be translated by the 3D pointing device 300o output which is usable to interact with the information displayed on display 308, e.g., to move the cursor 310 on the display 308. For example, such 3D pointing devices and their associated user interfaces can be used to make media selections on a television as shown in FIG. 3(b), which will be described in more detail below. Aspects of exemplary embodiments of the present invention can be optimized to enhance the user's experience of the so-called "10-foot" interface, i.e., a typical distance between a user and his or her television in a living room. For example, interactions between pointing, scrolling, zooming and panning, e.g., using a 3D pointing device 300 associated user interface, can be optimized for this environment as will be described below, although the present invention is not limited thereto.

Referring again to FIG. 3(a), an exemplary relationship between movement of the 3D pointing device 300 and corresponding cursor movement on a user interface will now be described. Rotation of the 3D pointing device 300 about the y-axis can be sensed by the 3D pointing device 300 and translated into an output usable by the system to move cursor 310 along the $y_2$ axis of the display 308. Likewise, rotation of the 3D pointing device 300 about the z-axis can be sensed by the 3D pointing device 300 and translated into an output usable by the system to move cursor 310 along the $x_2$ axis of the display 308. It will be appreciated that the output of 3D pointing device 300 can be used to interact with the display 308 in a number of ways other than (or in addition to) cursor movement, for example it can control cursor fading, volume or media transport (play, pause, fast-forward and rewind). Additionally, the system can be programmed to recognize gestures, e.g., predetermined movement patterns, to convey commands in addition to cursor movement. Moreover, other input commands, e.g., a zoom-in or zoom-out on a particular region of a display (e.g., actuated by pressing button 302 to zoom-in or button 304 to zoom-out), may also be available to the user.

According to exemplary embodiments of the present invention, user interfaces may use, at least in part, zooming techniques for moving between user interface views. The zooming transition effect can be performed by progressive scaling and displaying of at least some of the UI objects displayed on the current UI view to provide a visual impression of movement of those UI objects away from an observer. In another functional aspect of the present invention, user interfaces may zoom-in in response to user interaction with the user interface which will, likewise, result in the progressive scaling and display of UI objects that provide the visual impression of movement toward an observer. More information relating to zoomable user interfaces can be found in U.S. patent application Ser. No. 10/768,432, filed on Jan. 30, 2004, entitled "A Control Framework with a Zoomable Graphical User Interface for Organizing, Selecting and Launching Media Items", and U.S. patent application Ser. No. 09/829,263, filed on Apr. 9, 2001, entitled "Interactive Content Guide for Television Programming", the disclosures of which are incorporated here by reference.

Movement within the user interface between different user interface views is not limited to zooming. Other non-zooming techniques can be used, in addition to zooming or as an alternative thereto, to transition between user interface views. For example, panning can be performed by progressive translation and display of at least some of the user interface objects which are currently displayed in a user interface view. This provides the visual impression of lateral movement of those user interface objects to an observer.

Returning now to the application illustrated in FIG. 3(b), the GUI screen (also referred to herein as a "UI view", which terms refer to a currently displayed set of UI objects) seen on television 320 is a home view. In this particular exemplary embodiment, the home view displays a plurality of applications 322, e.g., "Photos", "Music", "Recorded", "Guide", "Live TV", "On Demand", and "Settings", which are selectable by the user by way of interaction with the user interface via the 3D pointing device 300. Such user interactions can include, for example, pointing, scrolling, clicking or various combinations thereof. For more details regarding exemplary pointing, scrolling and clicking interactions which can be used in conjunction with exemplary embodiments of the present invention, the interested reader is directed to U.S. patent application Ser. No. 11/417,764, entitled "METHODS AND SYSTEMS FOR SCROLLING AND POINTING IN USER INTERFACES", to Frank J. Wroblewski, filed on May 4, 2006, the disclosure of which is incorporated here by reference.

Smooth and Fast Scrolling

Figure 4:
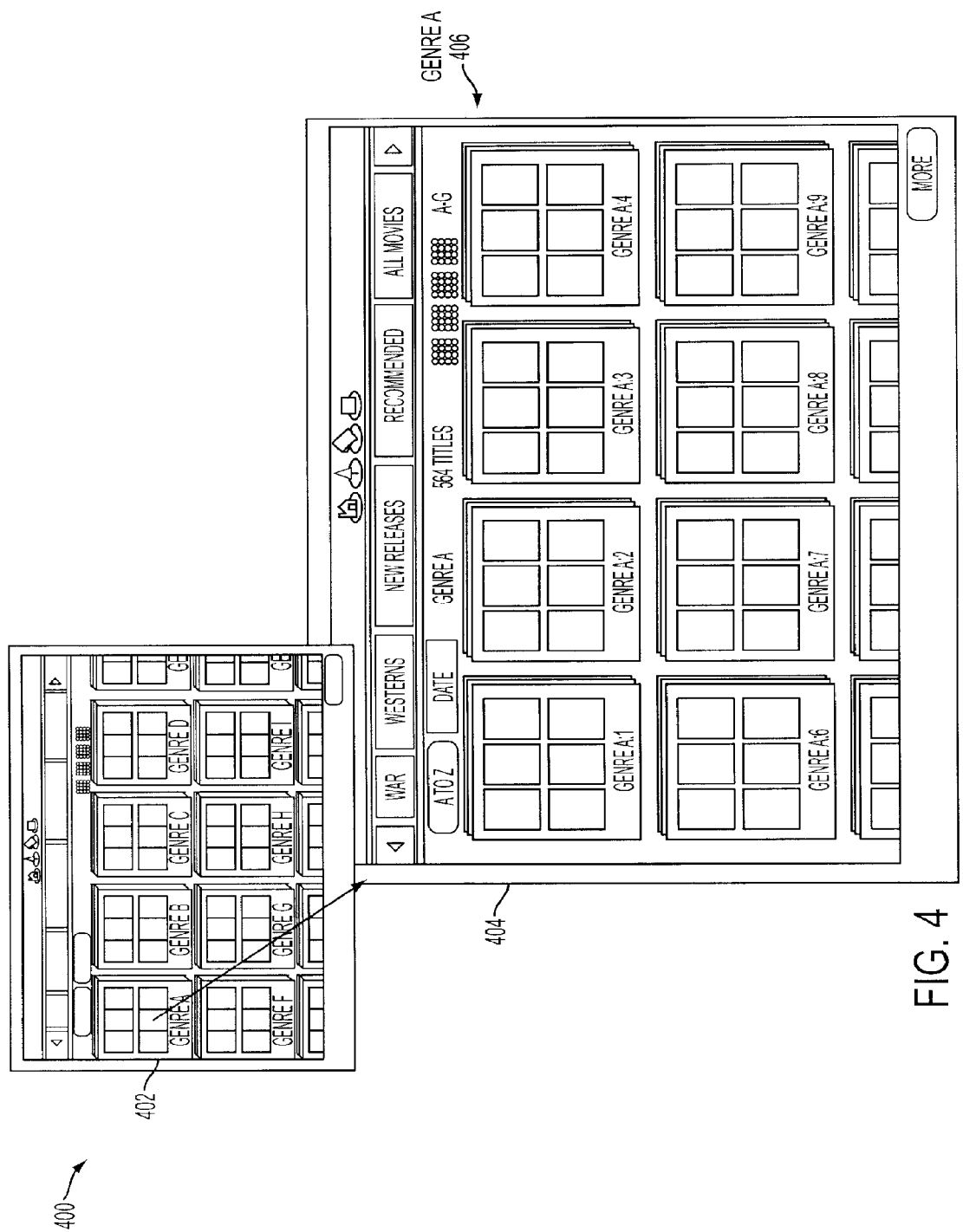
FIG. 4 depicts a zooming transition as well as a usage of an up function global navigation object according to an exemplary embodiment of the present invention.

Regardless of the different techniques which are employed in a particular user interface implementation to transition between user interface views, exemplary embodiments described herein focus on techniques for scrolling content within a currently displayed user interface view. Such content can include, for example, scrollable visual directories, scrollable lists, scrollable grid guides and any other scrollable content. For example, consider the UI view 400 shown in FIG. 4. This view illustrates a number of on-demand movie selections, categorized by genre, which view 400 can be reached by, for example, zooming in on the "On Demand" application object shown in the home view of FIG. 3(b). By pressing the zoom-in button 302 on the 3D pointing device 300 one more time, while the current focus (e.g., selection highlighting) is on the UI object associated with "Genre A" 402 in the UI view 400, the user interface will zoom-in on this object to display a new UI view 404. The UI view 404 will display a number of sub-genre media selection objects which can, for example, be implemented as DVD movie cover images. Although this example illustrates groupings or "bookcases" containing six images per genre, it will be appreciated that other implementations, or other views within the same implementation, may include more or fewer images per group, e.g., 16, 32, 64, etc. Additionally, some facility for scrolling the visual directories can be provided, e.g., to enable the user to reach those user interface objects (images in this example) which are not currently on-screen, such as the cut-off row of genres and sub-genres shown at the bottom of views 400 and 404, respectively. For example, according to one exemplary embodiment, rotating the scroll wheel 306 of the 3D pointing device 300 can provide an input command to the user interface to scroll the genres or subgenres up to reveal the images which are currently off-screen.

Figure 5:
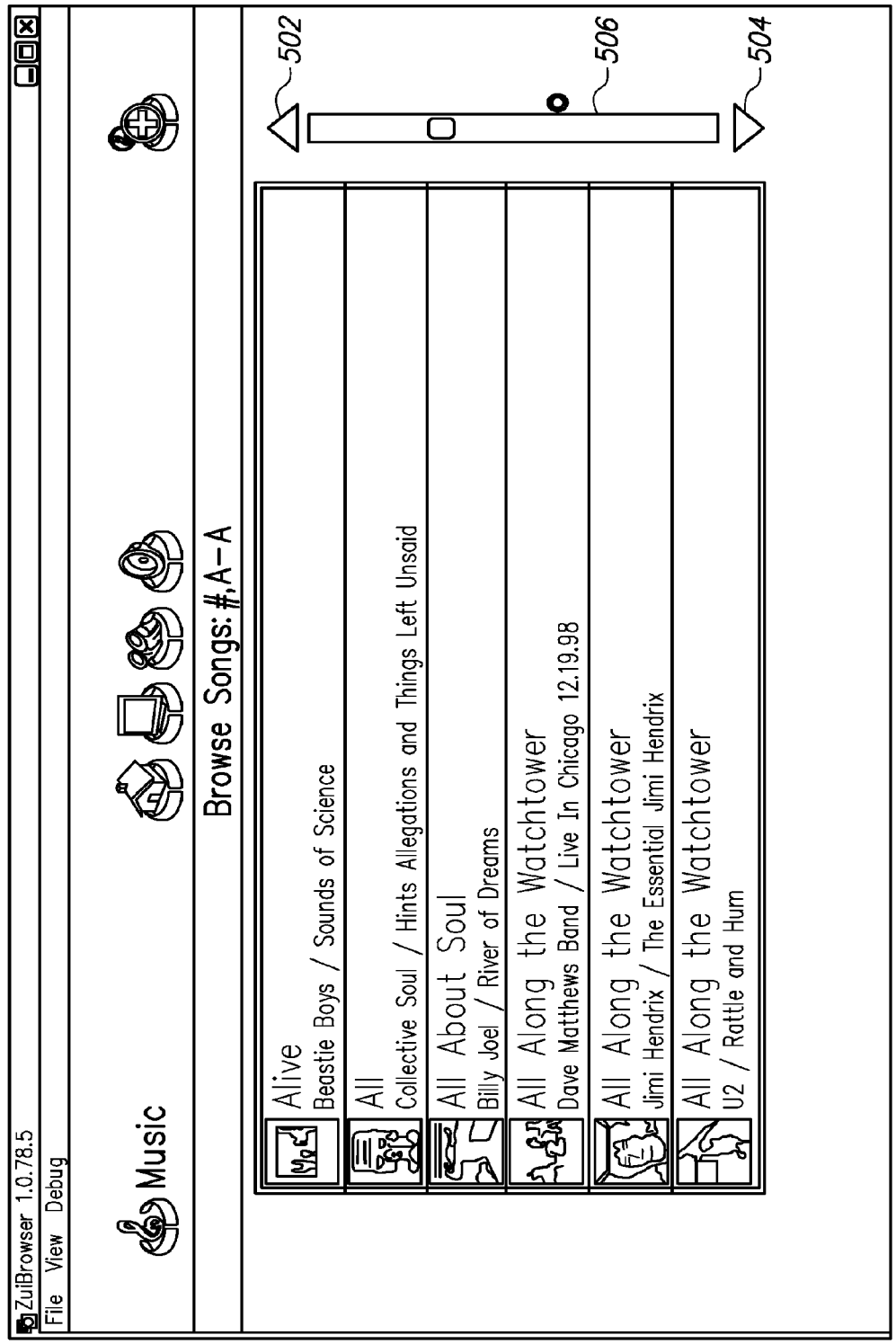
FIG. 5 shows a scrollable list according to an exemplary embodiment of the present invention.

According to exemplary embodiments, there are typically a number of different ways to scroll through a scrollable list using a device such as the 3D pointing device 300. As mentioned above, one method for scrolling through a list, such as the list shown in FIG. 5, would be to rotate the scroll wheel 306 of the 3D pointing device 300. Another exemplary method would be to use 3D pointing device 300 to point and click upon either the top arrow button 502 or the bottom arrow button 504 to move the scroll list up or down one row. Alternatively, a user could point to a location on an on-screen scrollbar 506 and click at that location to jump to a new portion of the scrollable list which corresponds to that location on the scrollbar 506. The modes of scrolling with a scroll wheel 306 can also be broken down into different modes of scrolling associated with the scrolling speed or amount of content to be scrolled at a time, e.g., single-row scrolling, page-at-a-time scrolling, and fast-scrolling.

As mentioned above, however, scrolling on such interfaces may pose additional challenges when, for example, the client system which is generating and controlling the user interface has relatively limited resources. In some implementations, generating the additional rows or columns of images, text, etc., of content needed to populate the rows or columns as they are coming on screen may take more processing resources than are currently available. For example, a so-called "thin" client such as a mid- to high-end TV set-top box having a 300 MHz (or less) processor, 128 megabytes (or less) of RAM and a 2-D graphics accelerator may have its resources sufficiently tied up in handling the various functions associated with the user interface to be unable to quickly generate content on-the-fly for scrolling in a manner which provides a smooth visual experience to the user. Note, however, that these exemplary embodiments are not limited to implementation on this purely illustrative set-top box or similar client devices. In fact, although these exemplary embodiments provide benefits for use with such thin client devices, they can be employed on client devices having significantly greater processing resources so as to free additional resources for other functionality.

Thus, according to one exemplary embodiment, a predetermined number of rows (and/or columns) in addition to those which are displayed in a user interface view are generated and stored for use when scrolling inputs are received by the user interface. For example, if the user interface view provides a list of 30 items (1 per row) of which 5 are visible at any given time, then the user interface could create 10 graphical rows (e.g., 5 visible on-screen at the moment and 5 hidden off-screen). Then, as the user scrolls, the user interface populates each row in the list with the appropriate data, e.g., metadata, a .jpg file associated with a DVD cover art image, etc., using pre-stored data to populate the "new" row(s) as the user scrolls the interface.

According to this exemplary embodiment, there are as many off-screen rows pre-generated as there are on-screen rows (alternatively there could be twice the number of rows off-screen as there are on-screen, e.g., half filled with data corresponding to rows "above" the top row currently displayed and half filled with data corresponding to rows "below" the bottom row which is currently displayed). This addresses, at least in part, the inability to create rows on the fly in some exemplary implementations, e.g., when such user interfaces are generated on thin client devices. Using this technique the user interface can scroll several rows in either direction while showing a continuous scrolling list to the user.

According to exemplary embodiments, single-row scrolling mode is typically the default scrolling mode and can be used whenever the user is moving slowly through content. Moving slowly through content can be described as any single-line scroll wheel 306 click or spin. It will be appreciated that a "scroll wheel click" can be described as moving a scrollable wheel one increment in either direction of movement from its current position. This single increment of scroll wheel motion is typically associated with some type of feedback, e.g., the sound of a single click or the feel of having pushed the wheel over a single set amount of resistance, for a user such that the user knows when a single increment of the wheel has occurred. In single-row mode, the scrolling list moves one row for each click of the scroll-wheel 306 i.e., by shifting existing rows up or down and re-populating the bottommost or topmost row, respectively, with pre-stored data. This provides a smooth scrolling experience as each row is moved smoothly from off-screen to on-screen.

According to another exemplary embodiment, page-at-a-time scrolling mode can be used, for example, to scroll lists of content for which a user has been found to most often browse the list a single page at a time. In this context, a "page" of content is equal to the number of rows or columns displayable at one time for a given user interface screen. For example, when in page-at-a-time scrolling mode, a single scroll operation for the user interface screen shown in FIG. 5 would result in all six rows being displaced with new data items. When page-at-a-time mode is enabled, any spin of the scroll wheel 306 greater than one click will move the user from single-row mode to page-at-a-time mode. Once a user has entered page-at-a-time mode, the list will be scrolled one page by moving all off-screen rows smoothly from off-screen to on-screen. Additionally, while transitioning from single-row scrolling mode to page-at-a-time scrolling mode the exact number of scroll-wheel clicks can be ignored, regardless of whether the user scrolled more or less than a full page. Scroll wheel interactions tend to come in discrete groups of clicks since the user will pause scrolling when their finger reaches the top or bottom of the scroll wheel bed. If they wish to continue scrolling they will generally pick up their finger, move it to the other end of the exposed wheel, and continue the previous movement. The page-at-a-time scrolling mode according to these exemplary embodiments can, for example, end in one of two ways:

1. If only one single discrete group of clicks is received then the system can enter page-at-a-time mode, scroll a single page, and then immediately return to normal scrolling mode.
2. If instead, after receiving the first group of clicks, the user continues to move the wheel in the same direction within a short enough time period to be considered part of the same user interaction (generally less than or equal to 1 second) the system can proceed to exit page-at-a-time mode and enter the fast-scrolling mode (described below).

However, these scrolling solutions, while they address in part the difficulties of scrolling in systems having, for example, limited resources, also create some additional challenges. For example, if the user scrolls continuously, the user interface may still not be able to repopulate and reposition each row (or column) fast enough to keep up with the scrolling animation occurring on-screen. For example, after a user in page-at-a-time scroll mode scrolls down by a complete page, the system will need some time to generate the new "off-screen" list elements. Continuous activation of, e.g., "page down", scrolling may cause the system to lag behind in being able to present new scrolling content which may provide jerky or discontinuous viewing. Alternatively, if, in a single action, the user scrolls more rows than the user interface has cached off-screen (e.g., in the example given above if the user scrolls more than 5 rows), then the user interface will run out of pre-stored rows to re-use and does not have sufficient pre-generated rows to populate the on-screen rows with actual list data.

To address these challenges, exemplary embodiments can also provide a fast-scrolling mechanism, e.g., in addition to single scrolling and page-at-a time scrolling, in combination with either single scrolling or page-at-a time scrolling, or by itself. The fast-scrolling mechanism according to these exemplary embodiments involves, for example, replacing the rows (or columns) displayed on-screen with an animation of dummy data when the user requests a scrolling of content which is faster than what the user interface can render to the display using, e.g., pre-cached rows or columns of actual data. Fast-scroll mode can, for example, be entered either when the user attempts to scroll more than a single page while in single-row mode or, if using page-at-a-time mode, when the user spins the scroll-wheel a second time once they have already entered page-at-a-time mode. However, it will be appreciated that these exemplary embodiments are not limited to these purely exemplary techniques for entering fast scroll mode and that this mode can be entered using any desired mechanism.

Figure 6:
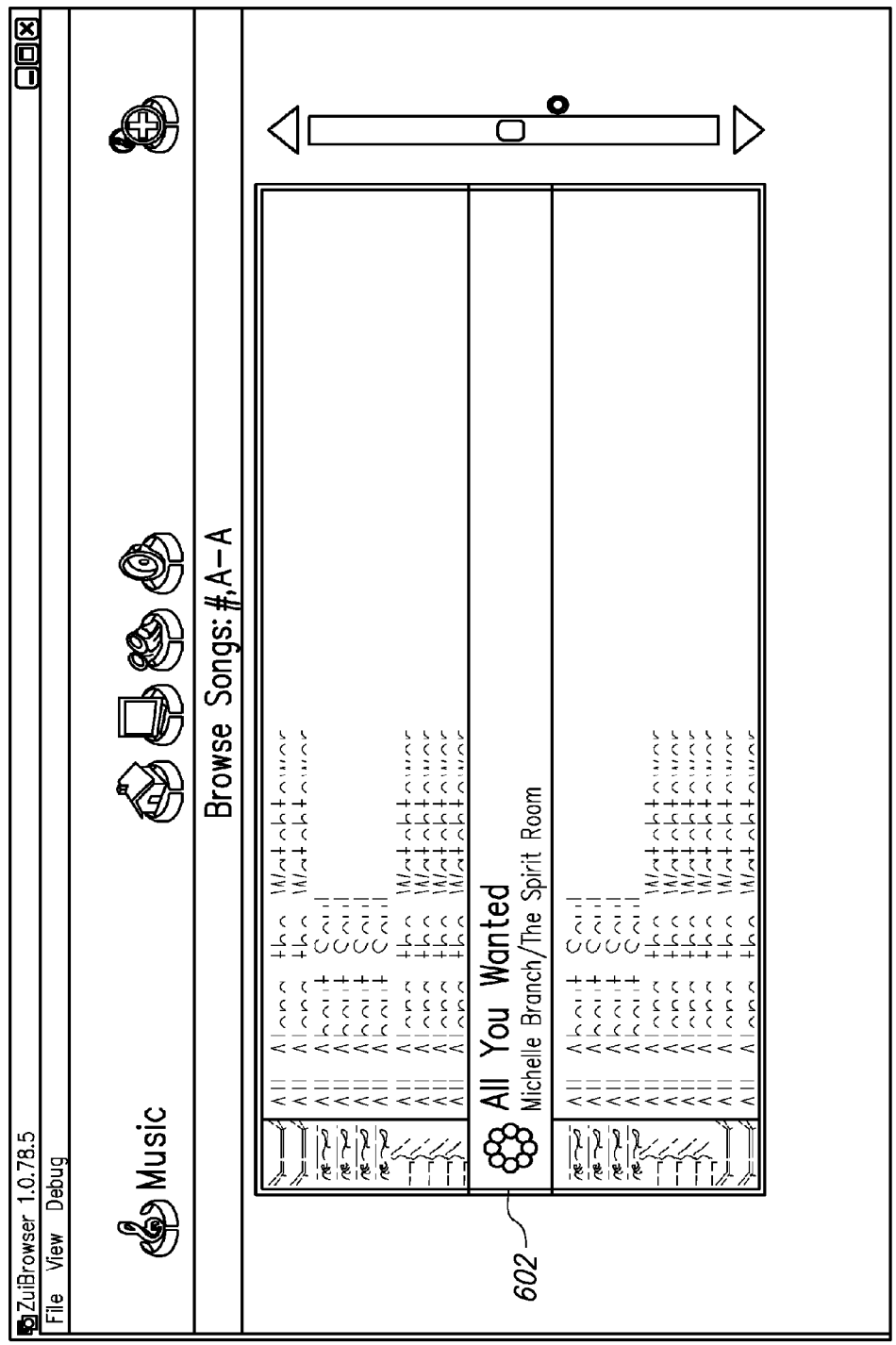
FIG. 6 shows animation and visual context information according to an exemplary embodiment of the present invention.

According to one exemplary embodiment, the animation of dummy data provided in lieu of actual scrolling content is individually created for each screen based on a set of representative content for that screen and is designed to appear as if the user were scrolling quickly past the actual content in the list. The content is blurred such that at least some of the individual characteristics of each row are indistinguishable from row to row, which provides blurred animation of dummy data to be perceived by the end user as representative of any the actual content being scrolled through very quickly. One purely illustrative example showing this type of fast scroll mode animation is shown in FIG. 6 for the list of FIG. 5. Although it may be difficult to discern in the still, snapshot image of the animation shown in FIG. 6, the fast scroll animation according to exemplary embodiments provides the user or observer of the user interface with the visual impression of rapid movement of the scrolling items, e.g., either vertically up or vertically down in this example, in a manner which is reminiscent of the visual impression provided by the images imprinted on the wheels of a slot machine as they are rotating during a spin. Thus the images which are scrolling may appear blurred to the user (as seen in FIG. 6) due to the speed at which they are scrolling across the screen.

While displaying the scrolling animation in this fast scroll mode, the user interface can intentionally avoid using actual data (i.e., hide the on-screen rows or columns) to further reduce the load on the client's CPU. More specifically, this can involve allowing the client's processor(s) to not update each individual row or column within the scrolling user interface element but, to instead, do a single update to all on-screen rows once the animation has ended and the user has reached their final scroll position. Additionally, if the data used to generate each list is queried from a database, jumping over the content between the start and end locations permits a reduction in the number of database queries generated to scroll the content and thereby further reduce load on the CPU.

In terms of scrolling content, the above described exemplary fast scroll process can be used to display a scrolling list of images, text, or a mixture of both. The displayed animation using dummy data will typically not be an exact match for any set of actual content being scrolled. However the dummy data used to perform the scrolling animation can be tailored based upon known available information regarding the actual content so that the animation is relatively well matched to the actual content being scrolled through. For example, in a bookshelf based visual solution there could be full bookshelves, i.e., space for 12 images in each shelf with 12 images being shown, or partially full bookshelves, i.e., space for 12 images with only an average of 3-5 images per shelf. Depending upon which bookshelf type matches the associated content, different animations can be displayed which approximate the desired look. For another example, compare music album covers with photo snapshots. Music album covers, while having an average color palette that differs between music album covers, typically have an average color palette that uses brighter colors than a typical photo snapshot. Therefore, animations using dummy data with brighter color palettes could be used for fast scrolling through visual directories or bookshelves of music album covers, as compared to the dummy data used to provide a blurred animation of fast scrolling through visual directories or bookshelves of photo snapshots.

According to some exemplary embodiments, the images used are animated Multiple-image Network Graphics (MNG) images. MNG is a member of the Portable Network Graphics (PNG) family that can include multiple images such as animations or complex still frames made from multiple PNG or Joint Photographic Experts Group (JPEG) Network Graphics (JNG) single image data streams. For more information regarding MNG, the interested reader is pointed to the MNG 1.0 specification which can be found online at www.libpng.org/pub/mng/spec/. Other methods of animation may, alternatively, be used to animate images for fast scrolling according to these exemplary embodiments, preferably (but not limited to) techniques which do not heavily tax the CPU(s) on the system which is displaying the user interface. For example, if an implementation had a video processor in addition to a general purpose processor, such an implementation could use pre-created video to display the animation in order to free up the CPU for processing the next group of data.

Animated MNG images of dummy data to be used in fast scroll mode for a particular list or user interface element can, for example, be created by taking two screenshots while actual content associated with that list is scrolled on a display to two consecutive positions. These two screenshot images can then be pasted together into a single continuous image such that the image can be scrolled indefinitely in either direction without any breaks. This image is then blurred, according to this exemplary embodiment, by 60 pixels along the axis of scroll to both give the illusion of speed and to make specific content unrecognizable. This blurred image is then animated using six frames which, when displayed in a repeating loop, create the illusion of large amounts of non-specific content scrolling indefinitely.

The animated MNG images of dummy data are, at this point in their creation, larger with respect to their file size than may be optimal for a typical thin client. To further improve these animations for use in fast scrolling according to some exemplary embodiments on thin clients, smaller images can be created and then scaled to fit the scrolling list. For example, this can be accomplished by scaling the image down to 20% of its original size along the axis of scroll and scaling it down to 50% of its original size along the off-axis, since the image detail is more visible along the non-moving axis. For example, if the size of the scrolling list was 800 pixels wide by 400 pixels high, the dummy data animation used during fast scroll mode could be 400 pixels wide by 80 pixels high, which is then stretched to fill the entire 800 pixel by 400 pixel display area. Alternatively, different scaling percentages can be used for the animation as desired for different clients and/or display sizes. If such optional scaling is used, the loss of data from scaling the image enhances the blurring effect on the image and further reduces the load on the client's CPU.

Figure 7:
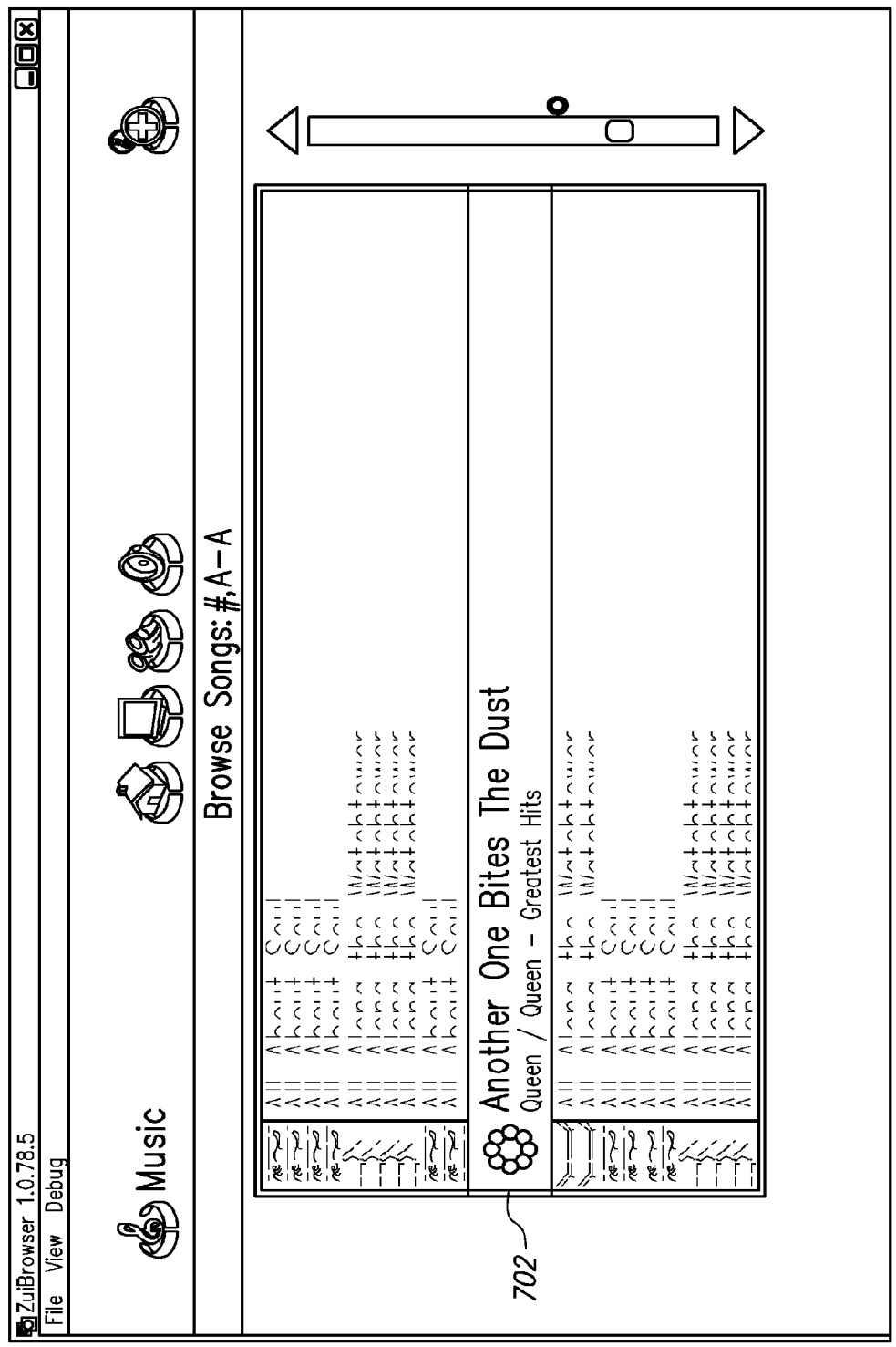
FIG. 7 illustrates moving through a scrollable list and updating the visual context information with respect to FIG. 6 according to an exemplary embodiment of the present invention.

During the above described dummy data animation process in fast scroll mode, the blurred content being displayed is typically not specifically recognizable by users. Therefore, additional visual feedback can be provided to the user to indicate their current or, alternatively, destination position in the scrolling list. The feedback provided can be generated differently for each type of scrolling list depending upon what is most helpful for a user to see regarding the list being scrolled. For example as shown in FIG. 6, if the scrollable list is an alphabetically ordered list of songs, the display of the title of the song at the current position 602 in the list can be displayed. As a user continues to scroll through the list while in the fast-scroll mode, the feedback 602 (which is also referred to herein as the "visual context information") is typically updated as shown, for example, in FIG. 7 to display a song title 702 showing the user how far he or she has scrolled. In this manner, the user is given dynamic visual clues and can see when he or she has reached the point that they are looking for and stop scrolling through the list.

Figure 8:
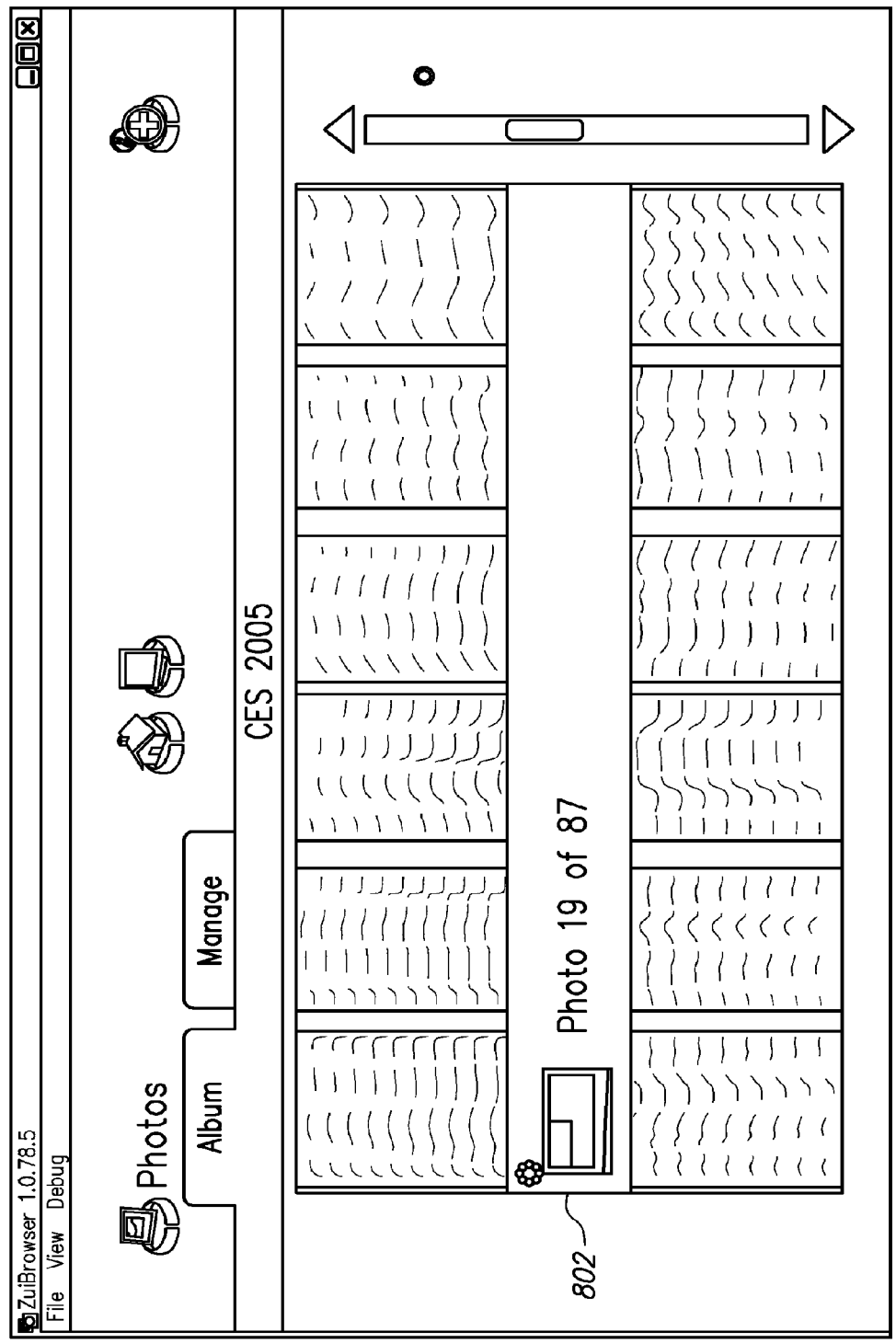
FIG. 8 shows information relating to a photograph as visual context information according to an exemplary embodiment of the present invention.

Other items can also be stored in lists that a user may wish to scroll through such as photos or a list of television shows, e.g., in an electronic program guide. For photos the dynamic visual context information which is shown during fast scroll mode could be a count or text of such photos, for example as seen in FIG. 8, "Photo 19 out of 87", and/or a thumbnail image of the photo 802 at that position in the list. For the television guide a channel number and name could be shown as the visual context information and/or the time and date could be shown depending upon, for example, how the scrollable list has been setup.

According to exemplary embodiments, fast-scroll mode is capable of using scroll acceleration to more quickly move the user through long lists of information. In fast-scroll mode, the total distance traveled from the starting scroll position to the current position is tracked. Once a user has moved more than ten rows, the system begins to multiply that value (distance tracked) by, for example, a logarithmic based modifier. For example, the scroll acceleration factor can, according to one exemplary embodiment, be implemented as the $\log_e$ of the number of rows scrolled damped by $\log_e(3)$, which damping factor can be varied. Thus, the acceleration formula can, for example, be expressed as $$\text{scrollDelta} = \text{scrollDelta}*(\text{ceil}(\log_e(\text{abs}(\text{scrollDelta}))/\log_e(3))),$$

where "scrollDelta" is the number of rows that the user attempted to scroll. This exemplary technique allows a user to quickly jump through long lists of data, but by using a logarithm based modifier it keeps the scroll speed from getting to be too fast such that the user passes by an item of interest on the list or repeatedly overshoots a desired selection.

Figure 9:
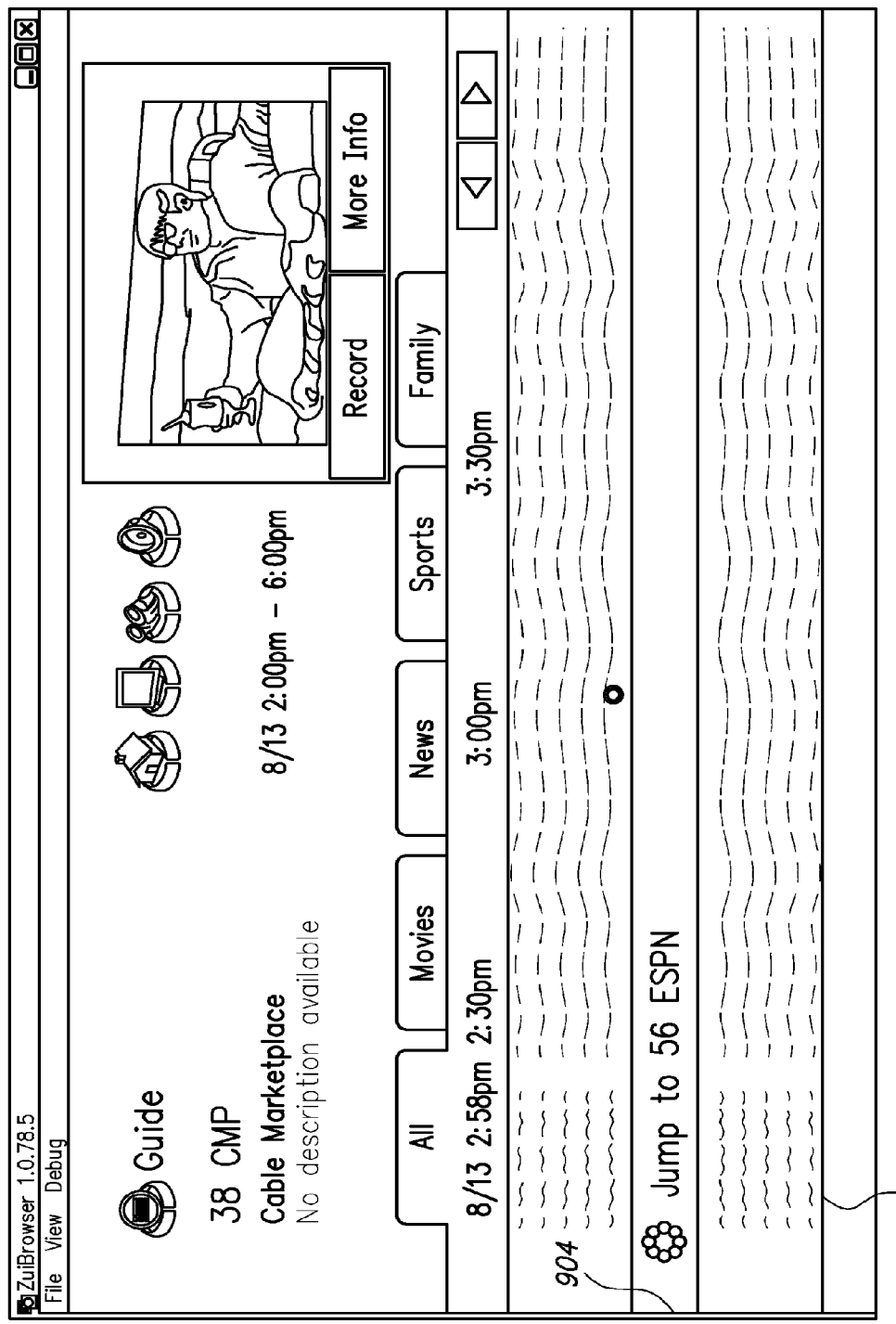
FIG. 9 depicts static visual context information according to an exemplary embodiment of the present invention.

Although the foregoing exemplary embodiments describe the visual context information which is displayed with the blurred, dummy data animation, according to another exemplary embodiment, the visual context information shown can remain static, e.g., when the visual context information identifies the scrolling destination rather than providing an update as to current position, as shown in FIG. 9. For example, when a user is viewing a list such as an electronic programming guide and chooses a selection point within the scrollable content to jump to, animation 902 and visual context information 904 can be displayed. In this case the visual context information 904 shows "Jump to 56 ESPN" to show the user what was selected and that the system is currently jumping to the location. In this case may be desirable to statically display the selection in the visual context information display 904 and not change it while moving through the list, i.e., during the display of the dummy data animation.

Figure 10:
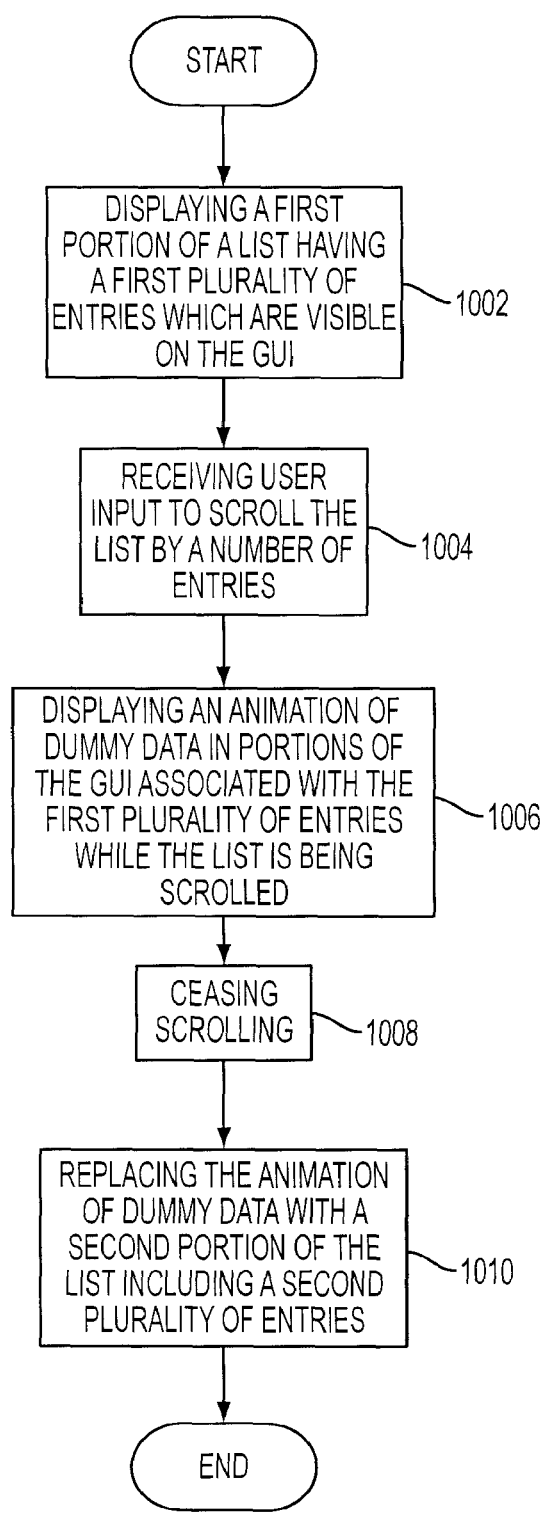
FIG. 10 is a method flowchart illustrating changes to a user interface while scrolling through a list according to an exemplary embodiment of the present invention.

Utilizing the above-described exemplary techniques according to exemplary embodiments, a method for scrolling through a list is shown in the flowchart of FIG. 10. Initially, a method for scrolling within a graphical user interface (GUI) includes: displaying a first portion of a list having a first plurality of entries which are visible on the GUI at step 1002; receiving user input to scroll the list by a number of entries at step 1004; displaying an animation of dummy data in portions of the GUI associated with the first plurality of entries while the list is being scrolled at step 1006; ceasing scrolling at step 1008; and replacing the animation of dummy data with a second portion of the list including a second plurality of entries at step 1010.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for scrolling within a graphical user interface comprising:
    displaying a first portion of a list having a first plurality of entries which are visible on said graphical user interface;
    receiving user input to scroll said list by a number of entries;
    displaying an animation of dummy data in portions of said graphical user interface associated with said first plurality of entries while said list is being scrolled when the user input requests scrolling of said list exceeds a predetermined number of entries, wherein the predetermined number of entries depends on the type of scroll modes, wherein said animation of dummy data is created for said list based on a set of representative content;
    ceasing scrolling; and
    replacing said animation of dummy data with a second portion of said list including a second plurality of entries, wherein said animation of dummy data has an associated color palette, wherein said color palette relates to items in said scroll list.

2. The method of claim 1, wherein said step of displaying an animation of dummy data is provided if said user input requests scrolling of said list by more than a predetermined number of entries and wherein, if said user input requests scrolling of said list by fewer than said predetermined number, then said step of animating is omitted and actual data is displayed as said list is scrolled.

3. The method of claim 2, wherein said predetermined number of entries is greater than one page of entries when in a single-row scroll mode or a second spin of a scroll wheel when in a page-at-a-time scroll mode.

4. The method of claim 2, wherein when said step of animating is omitted, said actual data is displayed one row at a time from pre-filled off-screen rows when in single-row mode or said actual data is displayed one page at a time from a pre-filled off-screen page when in page-at-a-time mode.

5. The method of claim 1, further comprising:
    displaying dynamic visual context information that is updated indicating current position within said list.

6. The method of claim 1, further comprising:
    displaying dynamic visual context information that is updated indicating current destination within said list.

7. The method of claim 1, wherein said user input to scroll said list occurs by clicking top or bottom arrows on an on-screen toolbar to move said list up or down one row.

8. A non-transitory computer-readable medium containing program instructions coded thereon which, when executed by a computer or processor, perform the steps of:
    displaying a first portion of a list having a first plurality of entries which are visible on said graphical user interface;
    receiving user input to scroll said list by a number of entries;
    displaying an animation of dummy data in portions of said graphical user interface associated with said first plurality of entries while said list is being scrolled when the user input requests scrolling of said list exceeds a predetermined number of entries, wherein the predetermined number of entries depends on the type of scroll modes, wherein said animation of dummy data is created for said list based on a set of representative content;

ceasing scrolling; and replacing said animation of dummy data with a second portion of said list including a second plurality of entries, wherein said animation of dummy data has an associated color palette, wherein said color palette relates to items in said scroll list.

9. The non-transitory computer-readable medium of claim 8, wherein said step of displaying an animation of dummy data is provided if said user input requests scrolling of said list by more than a predetermined number of entries and wherein, if said user input requests scrolling of said list by fewer than said predetermined number, then said step of animating is omitted and actual data is displayed as said list is scrolled.

10. The non-transitory computer-readable medium of claim 9, wherein said predetermined number of entries is greater than one page of entries when in a single-row scroll mode or a second spin of a scroll wheel when in a page-at-a-time scroll mode.

11. The non-transitory computer-readable medium of claim 9, wherein when said step of animating is omitted, said actual data is displayed one row at a time from pre-filled off-screen rows when in single-row mode or said actual data is displayed one page at a time from a pre-filled off-screen page when in page-at-a-time mode.

12. The non-transitory computer-readable medium of claim 8, further comprising:
displaying dynamic visual context information that is updated indicating current position within said list.

13. The non-transitory computer-readable medium of claim 8, further comprising:
displaying dynamic visual context information that is updated indicating current destination within said list.

14. A user interface generated by one or more processors executing sequences of instructions contained in a memory device, the user interface comprising:
a first portion of a list of items currently displayed on said user interface; and
a mechanism for receiving a user input to scroll said list,
wherein said user interface displays an animation of dummy data while said list is being scrolled when the user input requests scrolling of said list exceeds a predetermined number of entries, wherein the predetermined number of entries depends on the type of scroll modes, and subsequently replaces said animation of dummy data with a second portion of said list, further wherein said animation of dummy data is created for said list based on a set of representative content, wherein said animation of dummy data has an associated color palette, wherein said color palette relates to items in said scroll list.

15. The user interface of claim 14, wherein said display of said animation of dummy data is provided if said user input requests scrolling of said list by more than a predetermined number of entries and wherein, if said user input requests scrolling of said list by fewer than said predetermined number, then said animation of dummy data is omitted and actual data is displayed as said list is scrolled.

16. The user interface of claim 15, wherein when said animation of dummy data is omitted, said actual data is displayed one row at a time from pre-filled off-screen rows when in single-row mode or said actual data is displayed one page at a time from a pre-filled off-screen page when in page-at-a-time mode.

17. The user interface of claim 14, further comprising:
displaying dynamic visual context information that is updated indicating current position within said list.

18. The user interface of claim 14, further comprising:
displaying dynamic visual context information that is updated indicating current destination within said list.

* * * * *